United States Patent
Fraas et al.

(10) Patent No.: US 7,039,042 B1
(45) Date of Patent: May 2, 2006

(54) METHOD FOR DATA TRANSMISSION VIA A PACKET-ORIENTED COMMUNICATIONS NETWORK

(75) Inventors: Wolfgang Fraas, Wolfratshausen (DE); Klaus Huenlich, Neuching (DE); Karlo Nemeth, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/868,225

(22) PCT Filed: Dec. 13, 1999

(86) PCT No.: PCT/EP99/09866

§ 371 (c)(1),
(2), (4) Date: Jun. 15, 2001

(87) PCT Pub. No.: WO00/36870

PCT Pub. Date: Jun. 22, 2000

(30) Foreign Application Priority Data

Dec. 15, 1998 (EP) .................................. 98123836

(51) Int. Cl.
*H04L 12/66* (2006.01)
*H04Q 11/04* (2006.01)

(52) U.S. Cl. .................. 370/353; 370/395.65; 370/473; 370/474

(58) Field of Classification Search .............. 370/395.6, 370/395.61, 395.62, 395.65, 352, 353, 465, 370/473, 474
See application file for complete search history.

(56) References Cited

U.S. PATENT DOCUMENTS

| | | | | |
|---|---|---|---|---|
| 5,050,166 | A | * | 9/1991 | Cantoni et al. ............. 370/473 |
| 5,287,348 | A | * | 2/1994 | Schmidt et al. ............. 370/352 |
| 5,793,766 | A | | 8/1998 | Dieudonne et al. |
| 5,930,265 | A | * | 7/1999 | Duault et al. ............... 370/473 |
| 5,987,034 | A | * | 11/1999 | Simon et al. ................ 370/465 |
| 6,108,336 | A | * | 8/2000 | Duault et al. ............ 370/395.6 |
| 6,289,018 | B1 | * | 9/2001 | Song ....................... 370/395.6 |
| 6,778,529 | B1 | * | 8/2004 | Field et al. ................. 370/353 |
| 6,876,677 | B1 | * | 4/2005 | Kise .......................... 370/524 |

FOREIGN PATENT DOCUMENTS

| | | |
|---|---|---|
| DE | 196 04 245 A1 | 10/1997 |
| DE | 198 45 038 A1 | 4/2000 |
| GB | 2 270 820 | 3/1994 |

OTHER PUBLICATIONS

ITU-T G.960 Digital Sections and Digital Line Systems. Siemens AG Ics for Communications.

* cited by examiner

*Primary Examiner*—Hanh Nguyen
*Assistant Examiner*—Ahmed Elallam
(74) *Attorney, Agent, or Firm*—Bell, Boyd & Lloyd LLC

(57) ABSTRACT

A method for data transmission via a packet-oriented communications network, wherein, communications terminal devices are connected to the packet-oriented communications network via at least one transfer unit and a switching system. To transmit data between the switching system and the communications terminal devices, a time-slot-oriented data format is provided, which is formed from a periodic sequence of channel-specific information segments. For the transmission of data via the communications network, a user data area of a data packet used to transmit data via the communications network is subdivided into at least one first subpacket and into a second subpacket, data of a channel-specific information segment being transmitted in each case in the first subpackets.

10 Claims, 6 Drawing Sheets

METHOD FOR DATA TRANSMISSION VIA A PACKET-ORIENTED COMMUNICATIONS NETWORK

BACKGROUND OF THE INVENTION

1. Field of the Invention

The present invention relates, generally, to a method for data transmission between two communications devices via a packet-oriented communications network and, more specifically, to a transmission system for transmitting time-slot-oriented data between an exchange termination device ET and a line termination LT. According to the terminology of the ITU-T G.960 (3/93) standard, "access digital section for ISDN basic rate access" (international Telecommunication Union), in particular pages 2 and 3, the invention correspondingly relates to data transmission on the "V reference point".

2. Description of the Prior Art

A method is known, for example, from US patent specification U.S. Pat. No. 5,793,766 for two-way data transmission between communications devices supporting a time-slot-oriented data transmission protocol, having channel-specific information segments, via a packet-oriented communications network. Here, the data packets used to transmit data via the packet-oriented communications network are subdivided into a first sub-packet and into a second sub-packet, data of different channel-specific information segments in each case being transmitted in a first data packet.

A transmission system for transmitting time-slot-oriented data between an exchange termination device and a line termination normally forms part of a communications system which has a switching device and subscriber connection devices. The subscriber connection devices have subscriber interfaces for connecting communications terminal devices to the communications system. According to the ITU-T G.960 standard, the subscriber connection devices are connected via a line termination and an exchange termination device to the switching device of the communications system. A communications system of this type serves to set up or clear down narrowband communications connections between communications terminal devices connected to the subscriber connection devices and to enable narrowband communication (for example, voice or data communication) between the communications terminal devices.

In modern communications systems, data transmission normally takes place between the exchange termination device and the line termination on the basis of the time-slot-oriented data format IOM-2 (ISDN Oriented Modular Interface), which is formed from a periodic sequence of channel-specific information segments; referred to below as the time division multiplex channel. One time division multiplex channel is normally allocated, in each case, to each subscriber interface of a subscriber connection device.

In modern communications technology, there is a need for broadband transmission of information; for example, still and moving pictures in videotelephony applications or large data volumes on the Internet. This increases the importance of transmission technology for high and variable data transmission rates (greater than 100 Mbit/s), which take account both of data transmission requirements (high speed with variable transmission bit rate) and voice data transmission requirements (maintenance of temporal correlations in the case of data transmission via a network), in order to be able to integrate the separate networks currently existing for the different purposes into one network. A known data transmission method for high data speeds is referred to as Asynchronous Transfer Mode (ATM). Data transmission on the basis of the Asynchronous Transfer Mode currently enables a variable transmission bit rate of up to 622 Mbit/s.

In the cell-based data transmission method known as Asynchronous Transfer Mode (ATM), fixed-length data packets, referred to as ATM cells, are used for data transport. An ATM cell includes a five-byte cell header containing switching data relevant to the transport of an ATM cell, and a 48-byte user data field, referred to as the 'payload'.

Data transmission via an ATM-based communications network generally takes place in "virtual paths" or in virtual channels contained in the virtual paths. To do this, connection tables with switching information including a "virtual channel identifier" and a "virtual path identifier" are created when a connection is set up, before the start of the actual user data transmission, by exchanging signaling information in the respective ATM network nodes of the ATM-based communications network. In the connection tables, a "VCI value" is allocated to the virtual channel identifier and a "VPI value" is allocated to the virtual path identifier. The switching information recorded in the connection table of an ATM network node determines how the virtual paths or virtual channels contained in the virtual paths of the incoming and outgoing connections on the ATM network node are allocated to one another by the signaling; i.e., which input is linked by the switching system to which output of the ATM network node. The cell header of ATM cells transmitted via these virtual connections (virtual paths and virtual channels) essentially contains switching data including a VPI value and a VCI value. The ATM cell header data is processed at the input of an ATM network node; i.e., the switching data disposed therein is collected and evaluated. The ATM cells are then switched through the ATM network node using the switching information stored in the connection table to an output of the ATM network node representing a specific destination.

In the German patent application with the official reference 198 45 038.9, a transmission system between an exchange termination device and a line termination has already been proposed in which the transmission is implemented via an ATM-based communications network. Here, subscriber interfaces are made available in order to connect communications terminal devices via ATM transfer units, which are frequently referred to in the literature as the "ATM hub", which are connected to the ATM-based communications network. The exchange termination device of the communications system and the line termination implemented by the ATM transfer unit in each case have an ATM connection unit, via which, on the one hand, a connection to the ATM-based communications network is implemented and, on the other hand, a two-way conversion is carried out between the IOM-2 data format, normally provided for data transmission between the exchange termination device and the line termination, and the ATM data format.

The two-way conversion between the time-slot-oriented IOM-2 data format and the cell-based ATM data format takes place according to two different conversion methods. According to the first conversion method, on the basis of the specification CES 2.0 of the ATM Forum, the time-slot-oriented data is packeted byte-by-byte in ATM cells according to the first ATM adaptation layer AAL1. The ATM adaptation layer AAL (ATM Adaptation Layer) serves to adapt the ATM data format (corresponding to Layer 2 of the OSI reference model) to the network layer (Layer 3) of the OSI reference model (Open System Interconnection). According to the second conversion method, the time-slotoriented data is packeted byte-by-byte into ATM cells substructured according to the second ATM adaptation layer AAL2.

An object of the present invention, therefore, is to offer an alternative method which two-way data transmission can take place between the communications terminal devices and the switching system.

SUMMARY OF THE INVENTION

For a better understanding of the present invention with respect to the mode of operation of the transmission of time-slot-oriented data between an exchange termination device and a line termination, it is necessary to begin by re-examining known principles in more detail.

Transmission of the time-slot-oriented data between the exchange termination device and the line termination normally takes place, for example, on the basis of the IOM-2 data format known from the product document entitled "ICs for Communications—IOM®-2 Interface Reference Guide" from Siemens, Munich, 3/91, Order No. B115-H6397-X-X-7600, in particular pages 6 to 12.

A more rapid understanding of the relationships is provided by FIG. 1, which shows a schematic representation of the IOM-2 data format according to which time division multiplex frames IOM-R with a length of 125 μs are periodically transmitted. A time division multiplex frame IOM-R of this type is divided up into time division multiplex channels or subframes CH0, . . . , CH7; also frequently referred to in literature simply as "channels". The subframes CH0, . . . , CH7 are, in turn, subdivided in each case into two 8-bit user data channels B1, B2, into one 8-bit monitor channel M, into one 2-bit control information channel DI, into one 4-bit status channel C/I (Command/Indicate) and into in each case two 1-bit monitor status channels MR, MX. The control information channel DI, the status channel C/I and the two monitor status channels MR, MX are normally referred to jointly as the control channel D.

User data is transmitted via the user data channels B1, B2 between devices connected to an IOM-2 bus at a transmission bit rate in each case of 64 kbit/s. Control information allocated to the user data is transmitted via the control information channel D at a transmission bit rate of 16 kbit/s. The monitor channel serves, inter alia, to configure devices connected to an IOM-2 bus on the basis of an "IOM-2 bus master". The monitor status channels MR (Monitor Read) and MX (Monitor Transmit) serve to determine whether data from a device connected to the IOM-2 bus are read by the IOM-2 bus (MR=1, MX=0) or are output onto the IOM-2 bus (MR=0, MX=1). Information relating to real-time requirements which exist during data transmission between two devices connected to an IOM-2 bus are exchanged via the status channel C/I.

In the case of data transmission via an ATM-based communications network via ATM cells according to the first ATM adaptation layer AAL1, only one constant transmission bit rate can be implemented between the switching system and an ATM transfer unit since, irrespective of whether data is or is not actually transmitted, all channel information, of the two user data channels B1, B2, the monitor channel M and the control channel D, of the IOM-2 data format must be transmitted. On the other hand, in the case of data transmission via the ATM-based communications network via ATM cells according to the second ATM adaptation layer AAL2, a variable transmission bit rate can be implemented between the switching system and an ATM transfer unit, since the possibility exists for transmitting only individual channel information which is currently transmitting data.

An essential advantage of the method according to the present invention is that the method can be implemented in a simple manner in already existing systems without modifications being necessary at the interface between the switching system and the ATM transfer unit, referred to as the V reference point according to the terminology of the ITU-T G.960 standard.

One advantage of designs of the present invention defined herein is, inter alia, that through sub-structuring into sub-packets of the user data area of a data packet used for data transmission, to which channel-specific information of the time-slot-oriented data format can in each case be allocated, a variable transmission bit rate can be implemented in a simple manner between the switching system and the transfer units through non-transmission of individual subpackets containing no user data.

A further advantage of designs of the present invention defined in the subclaims is that, for two-way conversion between the time-slot-oriented IOM-2 data format and the packet-oriented ATM data format according to the fifth ATM adaptation layer AAL5, already existing AAL5 components can be used, so that no new developments are required.

A further advantage of designs of the present invention is that, through data transmission between a communications terminal device and the switching system via an existing dedicated connection between the switching system (PBX) and the ATM transfer unit via which the communications terminal device is connected to the ATM-based communications network, or, alternatively, via a connection individually set up for this data transmission, the "signaling load" or the administrative outlay can be adapted in a simple manner to current circumstances in or for the communications network.

Additional features and advantages of the present invention are described in, and will be apparent from, the following Detailed Description of the Preferred Embodiments and the Drawings.

DETAILED DESCRIPTION OF THE PREFERRED EMBODIMENTS

Figure 1:
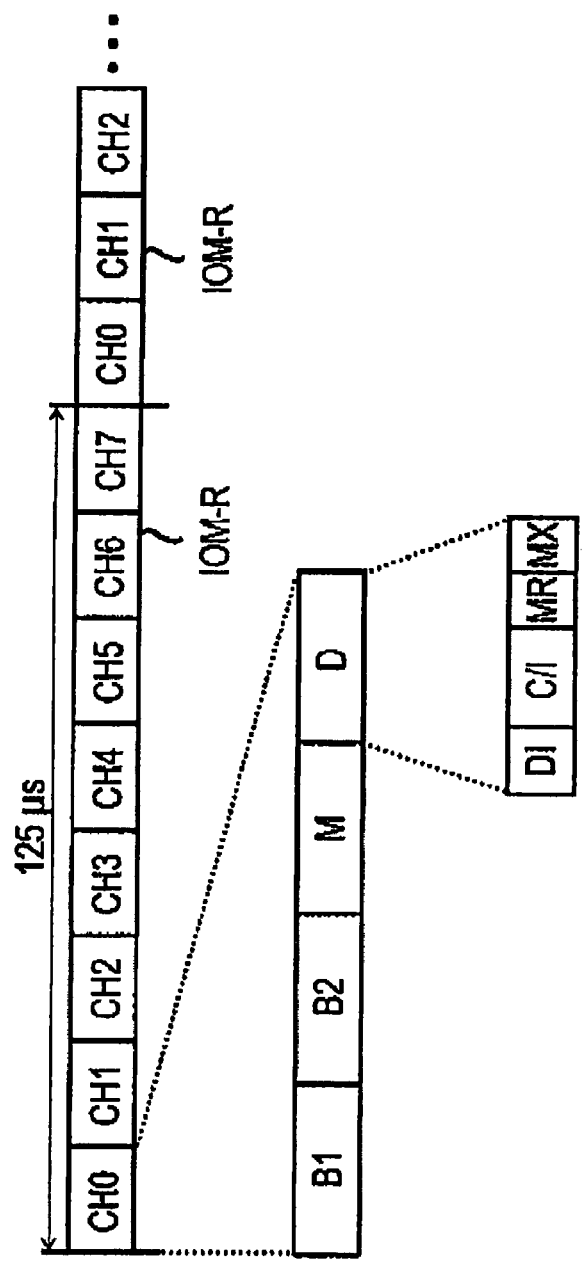
FIG. 1 shows a schematic representation of an IOM-2 data format.
Figure 2:
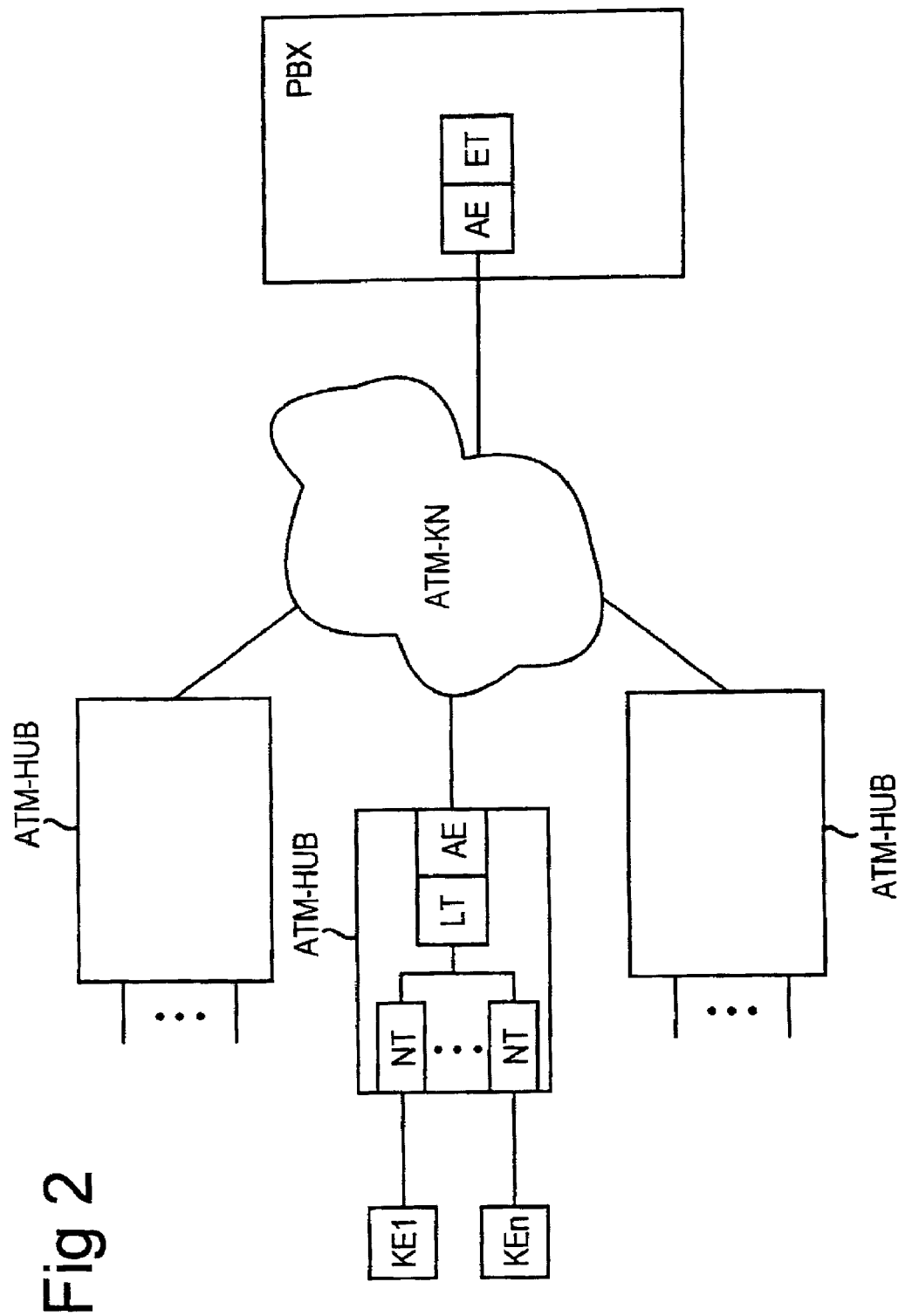
FIG. 2 shows a structural diagram schematically representing the essential functional units involved in the method according to the present invention.

FIG. 2 shows a schematic representation of a switching system PBX (Private Branch Exchange) with an exchange termination unit ET (Exchange Termination) disposed therein. The exchange termination unit ET is connected via a connection unit AE to an ATM-based communications network ATM-KN. Furthermore, ATM transfer units ATM-HUB, which have subscriber interfaces to connect communications terminal devices to the ATM-based communications network ATM-KN, are connected to the ATM-based communications network ATM-KN. Communications terminal devices KE1, . . . , KEn are shown as examples.

Via an ATM transfer unit, ISDN communications terminal devices (Integrated Services Digital Network) are normally connected via $S_0$ interfaces, or digital communications terminal devices are normally connected via interfaces derived therefrom, such as $U_{p0}$ interfaces, to the ATM-based communications network ATM-KN. Generally, an $S_0$ interface or a $U_{p0}$ interface includes, on the one hand, 2 user data channels which are designed as ISDN-oriented B-channels with a transmission bit rate in each case of 64 kbit/s and, on the other hand, a signaling channel which is designed as an ISDN-oriented D-channel with a transmission bit rate of 16 kbit/s. Furthermore, the possibility generally exists for connecting analog communications terminal devices via a/b interfaces to the ATM-based communications network ATM-KN.

The communications terminal devices KE1, . . . ,KEn are connected to the ATM transfer unit ATM-HUB; i.e., the subscriber interfaces are provided by the ATM transfer unit ATM-HUB according to the terminology of the ITU-T G.960 standard via network terminations NT (Network Termination). According to the ITU-T G.960 standard (International Telecommunication Union), the network terminations NT of an ATM transfer unit ATM-HUB are connected via a line termination LT disposed in the ATM transfer unit ATM-HUB to the exchange termination device ET of the switching system PBX. For data transmission via the ATM-based communications network ATM-KN, the line termination LT, corresponding to the exchange termination device ET of the switching system PBX, is connected via a connection unit AE to the ATM-based communications network ATM-KN.

A two-way conversion between the time-slot-oriented IOM-2 data format, normally provided for data transmission between the exchange termination device and the line termination, and the packet-oriented ATM data format according to the fifth ATM adaptation layer AAL5 is carried out by the connection units AE.

Figure 3:
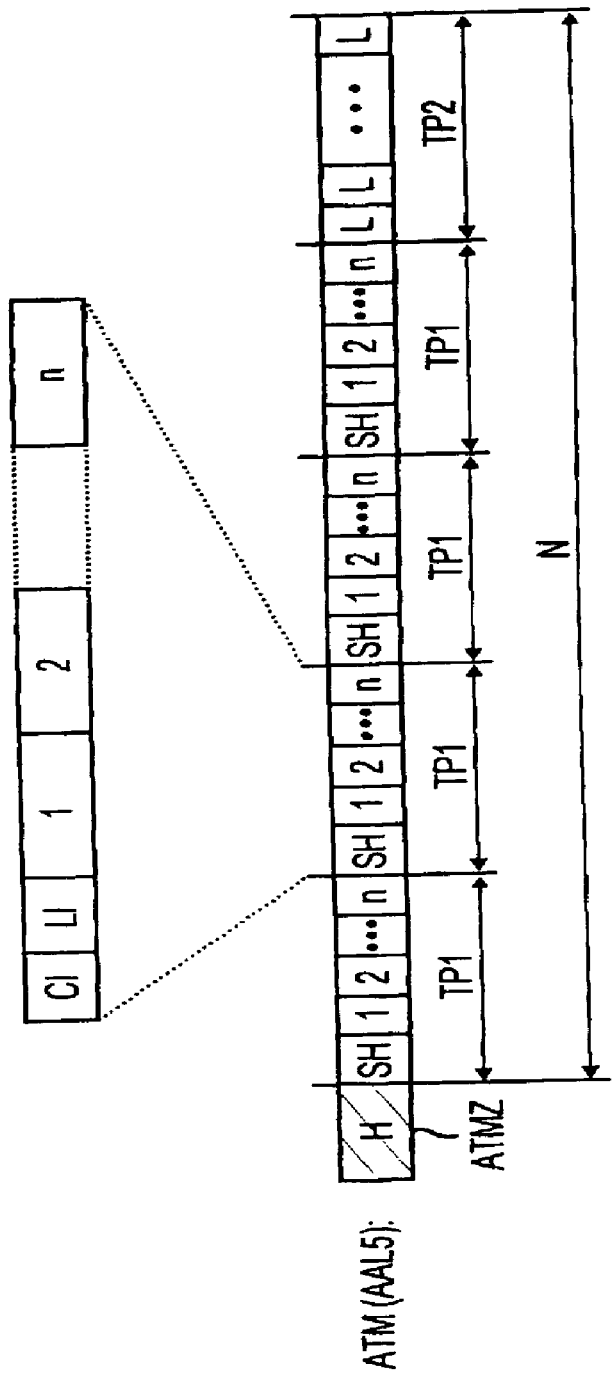
FIG. 3 shows a structural diagram schematically representing an ATM cell subdivided into subpackets.

FIG. 3 shows a schematic representation of an ATM cell subdivided into subpackets according to the fifth ATM adaptation layer AAL5. The ATM adaptation layer AAL (ATM Adaptation Layer) serves to adapt the ATM cell format (Layer 2 of the OSI reference model) to the network layer (Layer 3) of the OSI reference model (Open System Interconnection).

An ATM cell ATMZ generally includes a five-byte cell header H, frequently referred to as the "header" containing switching data relevant to the transport of an ATM cell ATMZ and a 48-byte user data field N, frequently referred to as the "payload". In the case of an ATM cell ATMZ subdivided according to the fifth ATM adaptation layer AAL5, the user data area N is subdivided into at least one first subpacket TP1 and into a second subpacket TP2. First subpackets TP1 are shown in FIG. 4 as examples.

A first subpacket TP1 is, in turn, subdivided into a 1-byte packet cell header SH and into a user data field of a defined length. The packet cell header SH includes a 3-bit segment identifier CI, also referred to as the "channel identifier", and a 5-bit length identifier LI, also referred to as the "length identifier". Via the 5-bit length identifier LI, user data fields of the first subpackets TP1 with a length n of $2^5=32$ bytes can essentially be defined. However, the first subpackets TP1 advantageously have a length of 10 bytes. Correspondence with the ATM Forum standard af-vtoa-0083.000, "Voice and Telephony over ATM to the Desktop Specification", 5/1997, is thereby achieved, in which a maximum user data field length of 40 bytes is provided for data transmission according to the fifth ATM adaptation layer AAL5.

The second subpacket TP2 is preferably used for the transport of dummy data L, but can also be used for what is frequently referred to as a cyclic redundancy check CRC. The length of the second subpacket TP2 is selected in such a way that the total length of the first data packets TP1 transmitted in an ATM cell ATMZ and the second subpacket TP2 corresponds to the length of the user data area N of the ATM cell ATMZ; i.e., 48 bytes. However, the length of a second subpacket TP2 for adaptation to the af-vtoa-0083.000 standard of the ATM Forum is at least 8 bytes.

Figure 4:
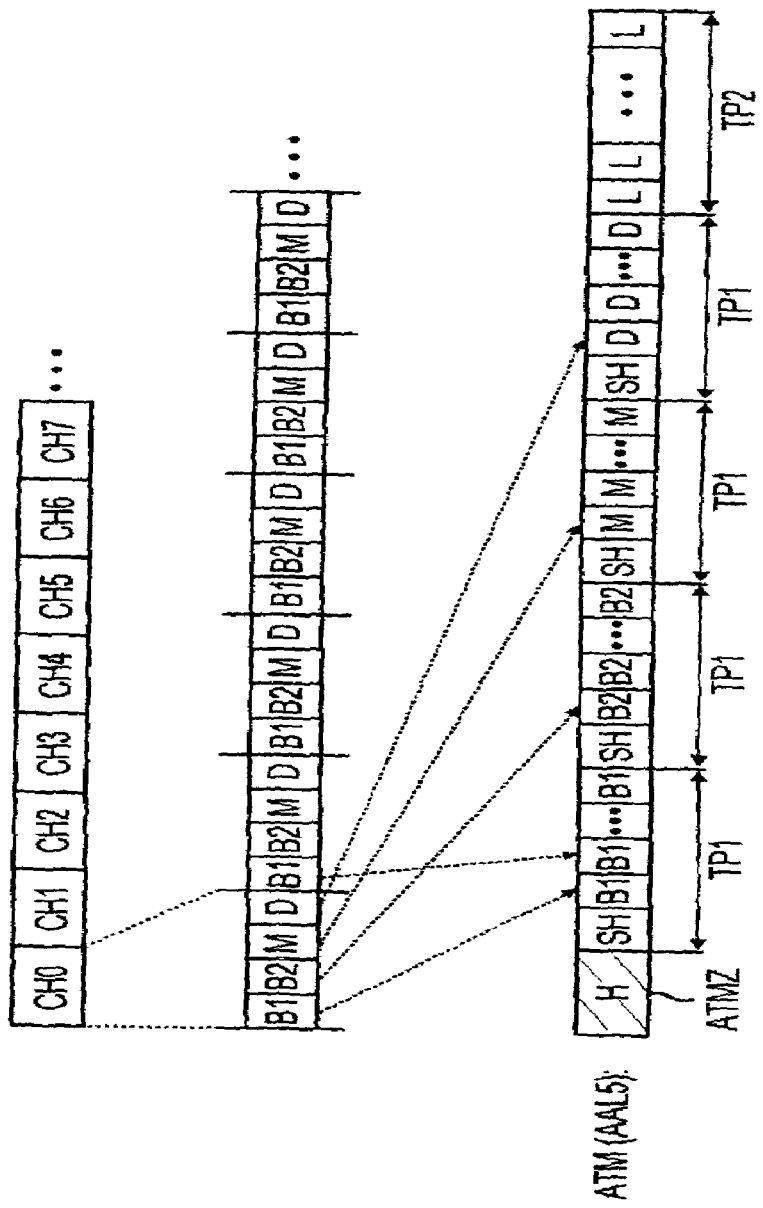
FIG. 4 shows a structural diagram schematically representing the conversion of the time-slot-oriented IOM-2 data format into the ATM data format according to the fifth ATM adaptation layer AAL5.

FIG. 4 shows, in a schematic representation, the conversion of the time-slot-oriented IOM-2 data format into the packet-oriented ATM data format according to the fifth ATM adaptation layer AAL5. In a conversion from the time-slot-oriented IOM-2 data format to the packet-oriented ATM data format, a unique VPI/VCI address is allocated to each subframe CHx for transmission via the ATM-based communications network ATM-KN; i.e., data allocated to different subframes CHx are transmitted in separate ATM cells ATMZ with a unique VPI/VCI address stored in the cell header H of the ATM cell ATMZ, shown as an example for the subframe CH0.

In the fifth ATM adaptation layer AAL5, as already described above, the user data area N of an ATM cell ATMZ can be subdivided into first and second subpackets TP1, TP2. Via the subdivision of an ATM cell ATMZ into first and second subpackets TP1, TP2, a number of channels can be defined within an ATM connection via the 3-bit segment identifier CI and are all provided with the same ATM address, which includes a VPI value and a VCI value. Here, for example, a CI address 011 is selected for the first user data channel B1, a CI address 100 for the second user data channel B2, a CI address 010 for the monitor channel M and a CI address 001 for the control channel D. In data transmission between the switching system PBX and an ATM transfer unit ATM-HUB, in particular an exchange termination device ET and a line termination LT, the possibility thus exists for data to be transmitted only of those channels (the first user data channel B1, the second user data channel B2, the monitor channel M and the control channel D) via which data is actually currently being transmitted.

In the present embodiment, one first subpacket TP1 of identical length is in each case defined successively for the first user data channel B1, the second user data channel B2, the monitor channel M and the control channel D of a subframe CHx, shown for the subframe CH0 as an example, and is transmitted in the user data area of the ATM cell ATMZ. Four first subpackets TP1 with a respective length of 10 bytes are shown as examples in FIG. 4. Following the first subpacket TP1 allocated to the control channel C, a second subpacket TP2 is transmitted. The length of the second subpacket TP2 is selected in this case in such a way that the total length of the first data packets TP1 transmitted in an ATM cell ATMZ and the second subpacket TP2 corresponds to the length of the user data area N of the ATM cell ATMZ; i.e., 48 bytes. In the present embodiment, the second subpacket TP2 thus has a length of 8 bytes.

The communications terminal devices KE1, . . . , KEn can be connected to the switching system PBX via the ATM-based communications network ATM-KN according to two different connection types, which are described in more detail below.

According to a first connection type, a "dedicated connection" based on the fifth ATM adaptation layer AAL5 is set up in each case between the switching system PBX and the ATM transfer units ATM-HUB of the ATM-based communications network ATM-KN, a definable transmission bit rate being guaranteed for a predefinable period for the dedicated connection. In the ATM-based communications network ATM-KN, this corresponds to the setting up in each case of a virtual connection between the switching system PBX and the ATM transfer units ATM-HUB of the ATM-based communications network ATM-KN which may, if necessary, also contain a number of virtual transmission channels.

The dedicated connection is set up here by administrative measures, wherein a transmission channel (frequently referred to as a "Virtual Channel Connection" VCC) can be individually allocated to each communications terminal device KE1, . . . , KEn connected via the ATM-based communications network ATM-KN to the switching system PBX.

Figure 5:
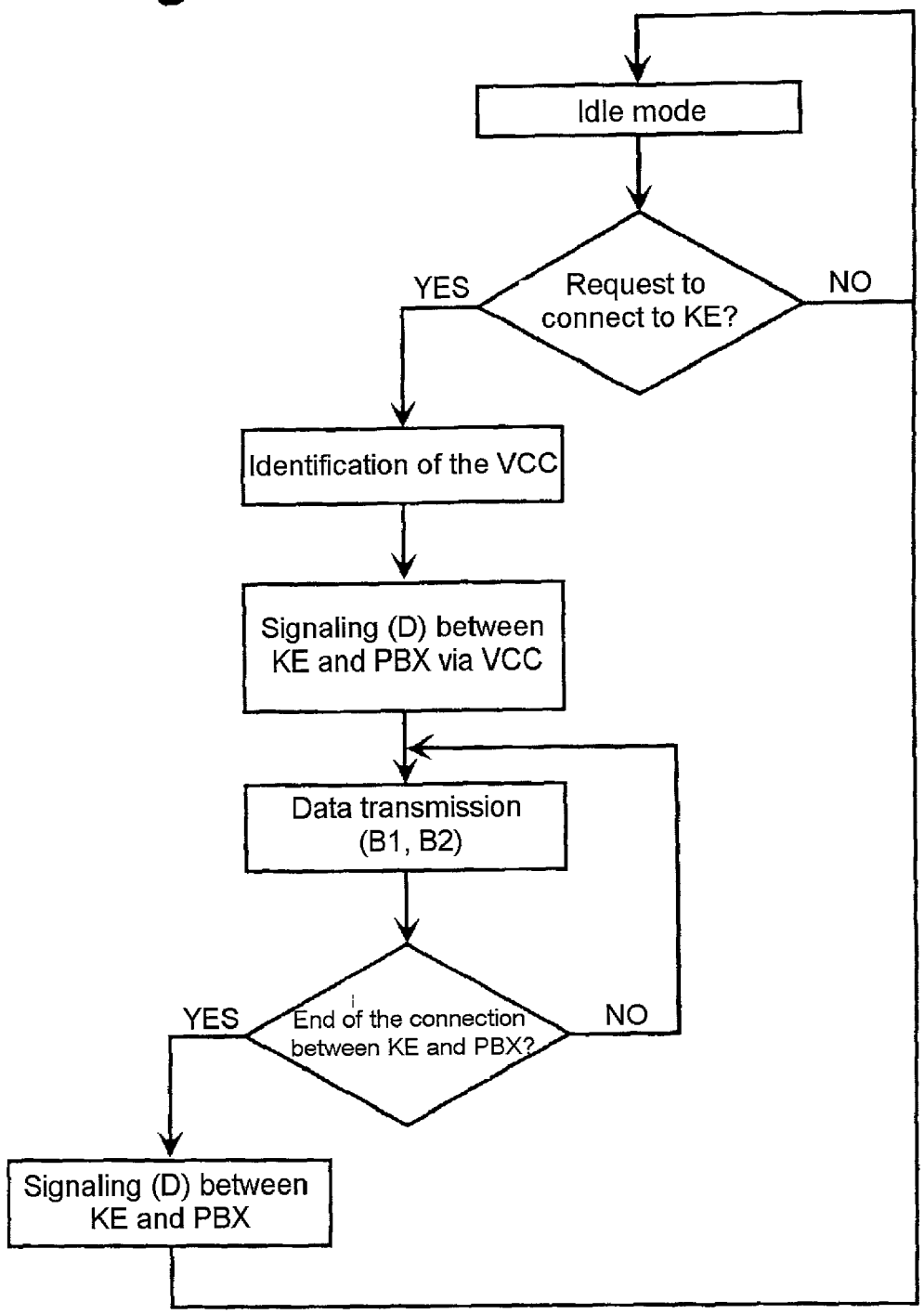
FIG. 5 shows a flowchart illustrating the method steps which take place during data transmission according to a first connection type of the communications terminal devices.

FIG. 5 shows a flowchart to illustrate the method steps which take place during data transmission between a communications terminal device KE1, . . . , KEn and the switching system PBX while a dedicated connection exists between the switching system PBX and the ATM transfer unit ATM-HUB which provides the connection unit AE for the relevant communications terminal device KE1, . . . , KEn. Starting with the communications terminal device KE1, . . . , KEn in idle mode, in the event of a request for a connection to the communications terminal device KE1, . . . , KEn, what is frequently referred to in the literature as the "Home PBX" of the communications terminal device KE1, . . . , KEn, i.e. the switching system PBX to which the communications terminal device KE1, . . . , KEn is registered, is identified by the corresponding ATM transfer unit ATM-HUB. The transmission channel VCC allocated to the communications terminal device KE1, . . . , KEn for data transmission via the ATM-based communications network ATM-KN is then determined, thereby providing a virtual connection via the ATM-based communications network ATM-KN during the already existing dedicated connection. Through the use of a connection based on the fifth ATM adaptation layer AAL5, the possibility exists for transmitting via the connection only data of the channels of the IOM-2 data format via which data are currently to be transmitted.

In a subsequent step, the signaling information required in order to set up a connection between the communications terminal device KE1, . . . , KEn and the switching system PBX is transmitted via the control channel D of the IOM-2 data format; i.e., a logical connection is set up between the communications terminal device KE1, . . . , KEn and the switching system PBX. The two-way user data transmission then takes place between the communications terminal device KE1, . . . , KEn and the switching system PBX via one or, alternatively, both user data channels B1, B2 of the IOM-2 data format. If the logical connection is subsequently to be cleared down between the communications terminal device KE1, . . . , KEn and the switching system PBX, for example as a result of a handset going on-hook on the communications terminal device KE1, . . . , KEn, it is carried out via corresponding signaling between the communications terminal device KE1, . . . , KEn and the switching system PBX via the control channel D. At the end of the connection, the communications terminal device KE1, . . . , KEn reverts to idle mode; i.e., no transmission resources are withdrawn from the ATM-based communications network ATM-KN by the transmission channel VCC.

However, dedicated connections of this type can be set up in a communications network in a limited number only, depending on the size and available transmission bandwidth of this communications network. Furthermore, with changing communications relationships between the communications units involved, all communications and data connections concerned (in an ATM-based communications network, all virtual transmission channels contained in a virtual path) must be taken into account. As a result, the administrative outlay for dedicated connections of this type increases very rapidly with the size of the communications network.

In order to reduce the administrative outlay, the communications terminal devices KE1, . . . , KEn can be connected alternatively to the switching system PBX according to a second connection type via "signaled connections"; i.e., a connection between the switching system PBX and the ATM transfer unit ATM-HUB which provides the connection unit AE for the relevant communications terminal device KE1, . . . , Ken via the ATM-based communications network ATM-KN is set up only when data transmission is actually to take place. The consequence of this, however, in contrast to the dedicated connections described, is that the "signaling load" in the ATM-based communications network ATM-KN increases.

Figure 6:
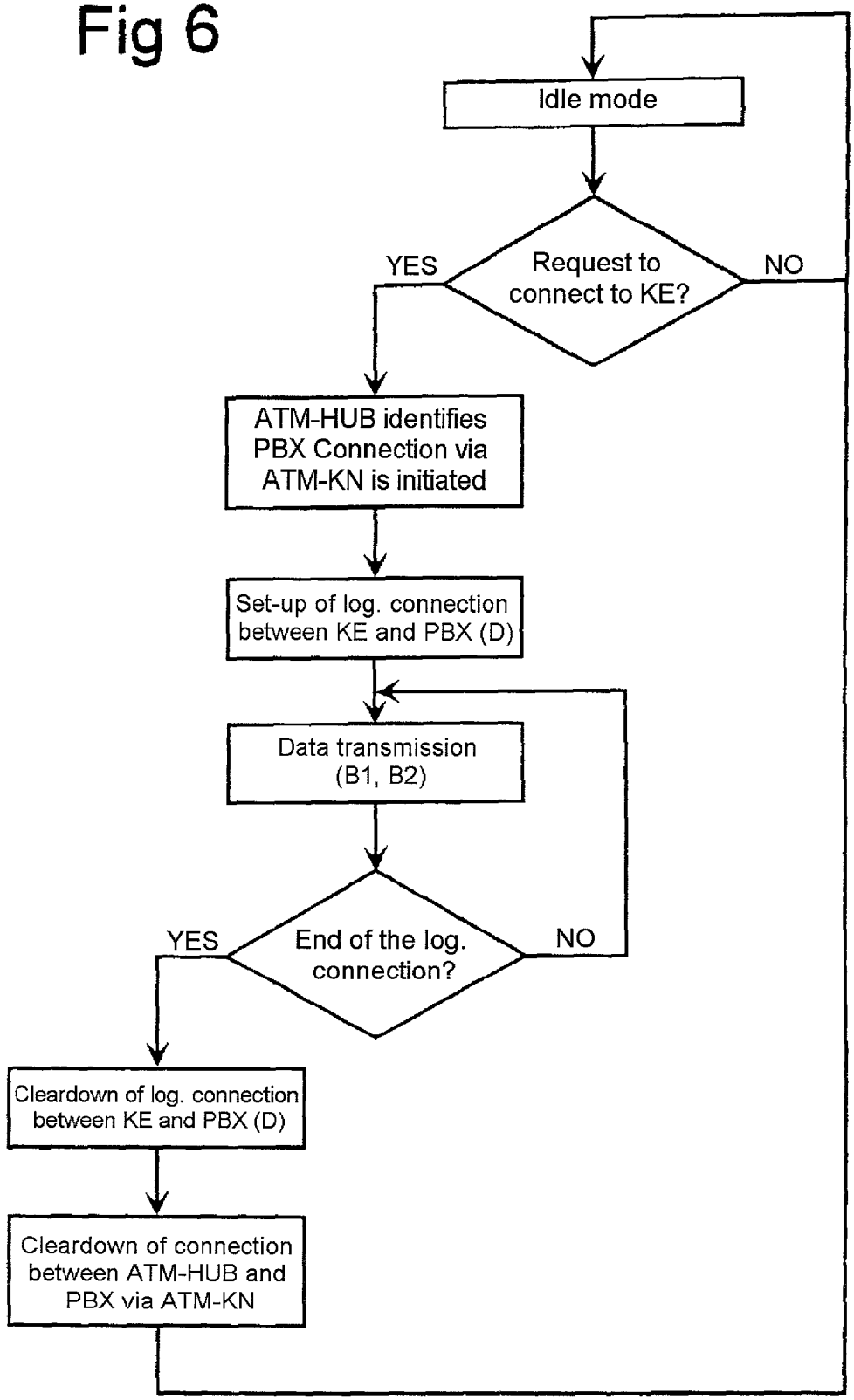
FIG. 6 shows a flowchart illustrating the method steps which take place during data transmission according to a second connection type of the communications terminal devices.

FIG. 6 shows a flowchart illustrating the method steps which take place during data transmission between a communications terminal device KE1, . . . , KEn and the switching system PBX during a signaled connection. Starting with the communications terminal device KE1, . . . , KEn in idle mode, in the event of a request for a connection to the communications terminal device KE1, . . . , KEn, the "Home PBX" of the communications terminal device KE1, . . . , KEn is identified by the corresponding ATM transfer unit ATM-HUB. A connection based on the fifth ATM adaptation layer AAL5 is then set up by the ATM transfer unit ATM-HUB to the channels required for the IOM-2 data format (the first user data channel B1, the second user data channel B2, the monitor channel M and the control channel D) between the ATM transfer unit ATM-HUB and the switching system PBX via the ATM-based communications network ATM-KN. Once it has been set up, this connection is made available to the communications terminal device KE1, . . . , KEn for data transmission between the communications terminal device KE1, . . . , KEn and the switching system PBX. Through the use of a connection based on the fifth ATM adaptation layer AAL5, the possibility exists for transmitting via the connection only data of the channels of the IOM-2 data format via which data is currently to be transmitted.

In a subsequent step, the signaling information required in order to set up a connection between the communications terminal device KE1, . . . , KEn and the switching system PBX is transmitted via the control channel D; i.e., a logical connection is set up between the communications terminal device KE1, . . . , KEn and the switching system PBX. The two-way user data transmission then takes place between the communications terminal device KE1, ..., KEn and the switching system PBX via one or, alternatively, both user data channels B1, B2. If the logical connection is subsequently to be cleared down between the communications terminal device KE1, ..., KEn and the switching system PBX, for example as a result of a handset going on-hook on the communications terminal device KE1, ..., Ken, it is carried out via corresponding signaling between the communications terminal device KE1, ..., KEn and the switching system PBX via the control channel D. Finally, the ATM transfer unit ATM-HUB again clears down the connection between the switching system PBX and the ATM transfer unit ATM-HUB via the ATM-based communications network ATM-KN. The communications terminal device KE1, ..., KEn then reverts to idle mode.

Although the present invention has been described with reference to specific embodiments, those of skill in the art will recognize that changes may be made thereto without departing from the spirit and scope of the invention as set forth in the hereafter appended claims.

We claim as our invention:

1. A method for data transmission between two communications terminal devices via a packet-oriented communications network, the method comprising the steps of:
   providing a time-slot-oriented data format, formed from a periodic sequence of channel-specific information segments, for the data transmission between the two communications terminal devices;
   providing a data packet for the data transmission between the two communications terminal devices wherein the data packet includes a user data area;
   subdividing the user data area into at least one first subpacket of a first length and into a second subpacket of a second length, wherein the at least one first subpacket includes a header with a segment identifier and a length identifier; and
   transmitting data of the same channel-specific information segment in a respective one of the at least one first subpacket, wherein the at least one first subpacket is allocated by the segment identifier to the respective channel-specific information segment and the number of data transmitted in the respective at least one first subpacket is defined by the length identifier.

2. A method for data transmission between two communications terminal devices via a packet-oriented communications network as claimed in claim 1, the method further comprising the step of:
   effecting the data transmission between the communications terminal devices and a switching system, the communications terminal devices being connected via at least one transfer unit to the packet-oriented communications network.

3. A method for data transmission between two communications terminal devices via a packet-oriented communications network as claimed in claim 1, the method further comprising the step of:
   allocating each of the at least one first subpacket to the respective channel-specific information segment, the transmission of each of the at least one first subpacket being suppressible.

4. A method for data transmission between two communications terminal devices via a packet-oriented communications network as claimed in claim 1, the method further comprising the steps of:
   transmitting dummy data in the second subpacket; and
   selecting the length of the second subpacket such that a total length of the transmitted at least one first subpacket and the second subpacket corresponds to a length of the user data area of the data packet.

5. A method for data transmission between two communications terminal devices via a packet-oriented communications network as claimed in claim 1, wherein the second subpacket is at least 8 bytes long.

6. A method for data transmission between two communications terminal devices via a packet-oriented communications network as claimed in claim 1, wherein the time-slot-oriented data format is a standardized IOM-2 data format.

7. A method for data transmission between two communications terminal devices via a packet-oriented communications network as claimed in claim 1, wherein data is transmitted via the packet-oriented communications network based on an Asynchronous Transfer Mode data format.

8. A method for data transmission between two communications terminal devices via a packet-oriented communications network as claimed in claim 7, wherein two-way conversion between the time-slot-oriented data format and the Asynchronous Transfer Mode data format is effected via a fifth Asynchronous Transfer Mode adaptation layer AAL5 agreement.

9. A method for data transmission between two communications terminal devices via a packet-oriented communications network as claimed in claim 7, wherein data to be transmitted between at least one communications terminal device and a switching system is transmitted via an existing dedicated connection between the switching system and an Asynchronous Transfer Mode transfer unit, via which the at least one communications terminal device is connected to the packet-oriented communications network.

10. A method for data transmission between two communications terminal devices via a packet-oriented communications network as claimed in claim 7, wherein data to be transmitted between at least one communications terminal device and a switching system is transmitted via a connection individually set up for the data transmission between the switching system and an Asynchronous Transfer Mode transfer unit, via which the at least one communications terminal device is connected to the packet-oriented communications network.

* * * * *